United States Patent
Falk et al.

(10) Patent No.: US 11,477,175 B2
(45) Date of Patent: Oct. 18, 2022

(54) METHOD AND COMMUNICATION UNIT FOR THE CRYPTOGRAPHICALLY PROTECTED UNIDIRECTIONAL DATA TRANSMISSION OF PAYLOAD DATA BETWEEN TWO NETWORKS

(71) Applicant: Siemens Mobility GmbH, Munich (DE)

(72) Inventors: Rainer Falk, Poing (DE); Stefan Seltzsam, Aying (DE); Hermann Seuschek, Munich (DE); Martin Wimmer, Neubiberg (DE)

(73) Assignee: SIEMENS MOBILITY GMBH, Munich (DE)

( * ) Notice: Subject to any disclaimer, the term of this patent is extended or adjusted under 35 U.S.C. 154(b) by 273 days.

(21) Appl. No.: 16/929,312

(22) Filed: Jul. 15, 2020

(65) Prior Publication Data

US 2021/0021578 A1    Jan. 21, 2021

(30) Foreign Application Priority Data

Jul. 17, 2019 (EP) ..................... 19186690

(51) Int. Cl.
*H04L 9/40* (2022.01)
(52) U.S. Cl.
CPC ........ *H04L 63/0442* (2013.01); *H04L 63/166* (2013.01)
(58) Field of Classification Search
CPC ..................... H04L 63/0442; H04L 63/166
See application file for complete search history.

(56) References Cited

U.S. PATENT DOCUMENTS

| | | | |
|---|---|---|---|
| 6,330,562 B1* | 12/2001 | Boden | H04L 41/28 707/999.009 |
| 2004/0088539 A1* | 5/2004 | Infante | H04L 9/0861 713/153 |
| 2011/0231652 A1* | 9/2011 | Bollay | H04L 63/0442 713/153 |
| 2016/0234182 A1* | 8/2016 | Bone | H04L 63/062 |
| 2017/0346851 A1* | 11/2017 | Drake | H04L 9/0838 |

FOREIGN PATENT DOCUMENTS

| | | |
|---|---|---|
| DE | 102015200279 A1 | 7/2016 |
| DE | 102017212474 A1 | 1/2019 |

OTHER PUBLICATIONS

Extended European Search Report in corresponding German Patent Application No. 1186690.4 dated Nov. 20, 2019. 11 pages.

* cited by examiner

*Primary Examiner* — William S Powers
(74) *Attorney, Agent, or Firm* — Schmeiser, Olsen & Watts LLP

(57) ABSTRACT

A method for the cryptographically protected unidirectional data transmission of payload data, wherein one or more data packets includes the payload data are transmitted on an end-to-end data transmission link from a first communication unit in a first network via a one-way communication unit, which is arranged between the first network and a second network, to a second communication unit in the second network, is provided.

9 Claims, 2 Drawing Sheets

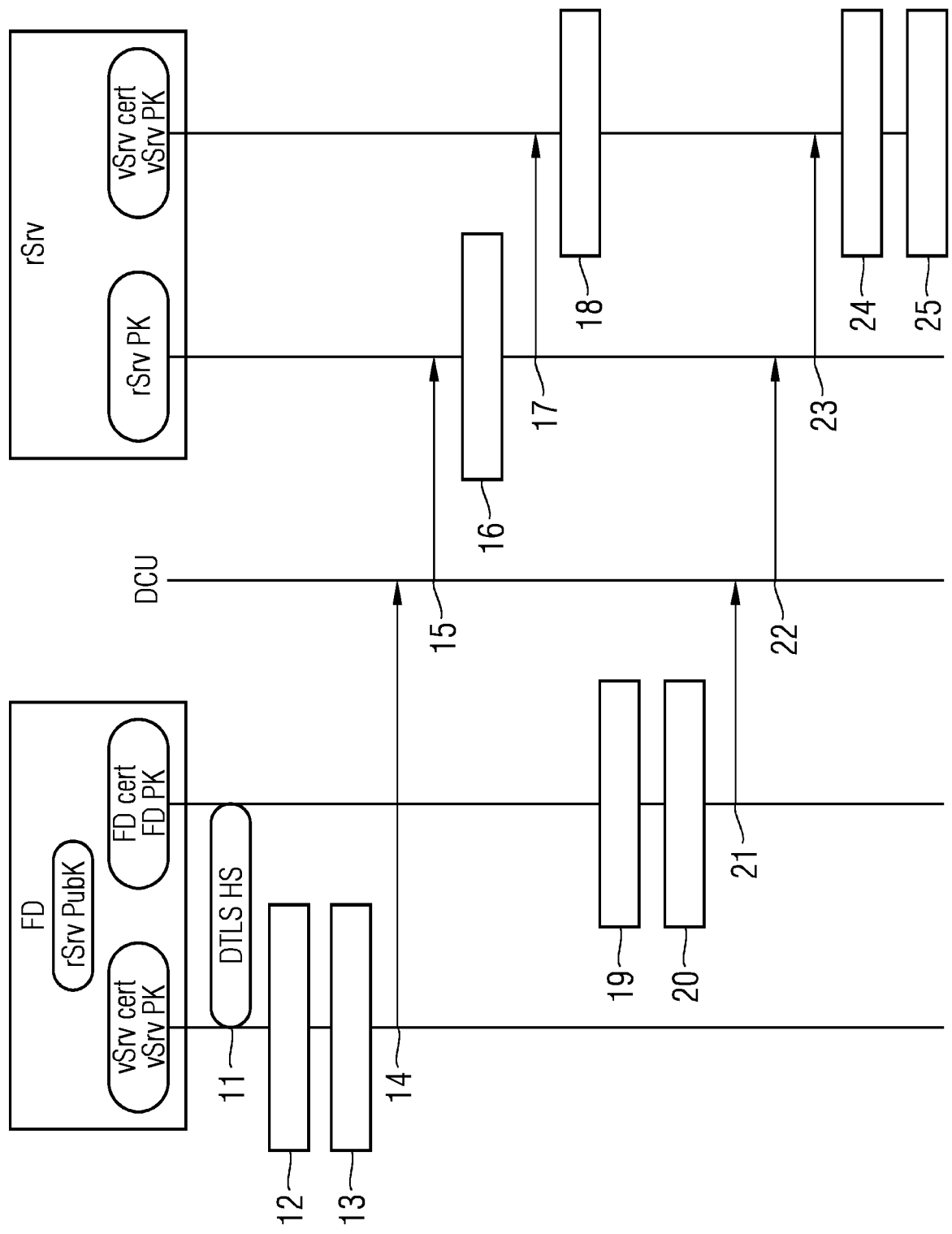

Figure 1:
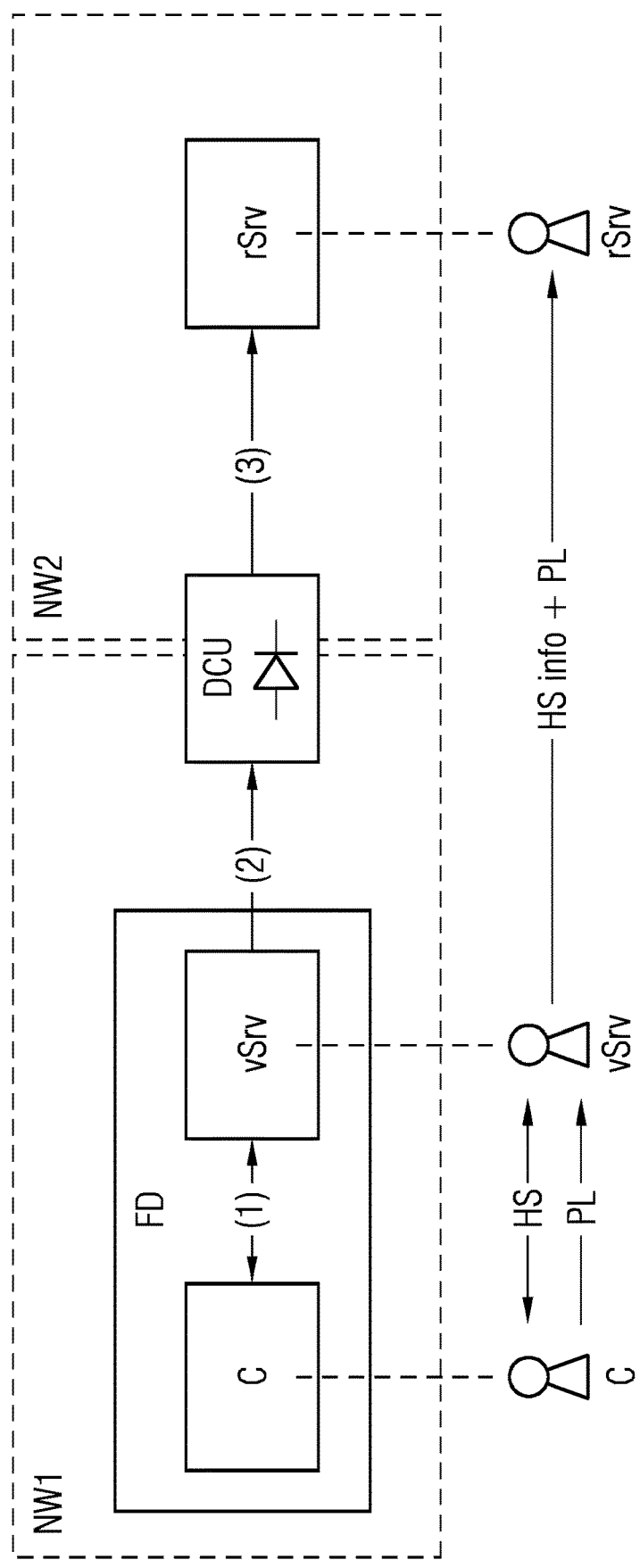

METHOD AND COMMUNICATION UNIT FOR THE CRYPTOGRAPHICALLY PROTECTED UNIDIRECTIONAL DATA TRANSMISSION OF PAYLOAD DATA BETWEEN TWO NETWORKS

CROSS-REFERENCE TO RELATED APPLICATIONS

This application claims priority to European Patent Application No. 19186690.4, having a filing date of Jul. 17, 2019, the entire contents of which are hereby incorporated by reference.

FIELD OF TECHNOLOGY

The following relates to a method for the cryptographically protected unidirectional data transmission of payload data (e.g. data of a field device) between a first network having a first security requirement and a second network having a second security requirement, which is different in comparison with the first network, and to an associated communication unit and computer program product.

BACKGROUND

For the purpose of secure communication between a security-critical network and an open network, such as e.g. an industrial control network (or operational network) and a conventional IT network, it is possible to use one-way communication units, for example, such as e.g. data diodes, in order to allow unidirectional reaction-free data transmission. A data diode having a feedback channel, also referred to as a bidirectional network guard or security gateway, allows secure data transfer between two information areas having different security levels. A network guard is usually a combination of hardware and software and allows more functionality than firewalls, as a result of which a higher level of protection is achievable than in the case of conventional firewalls. In particular, the freedom from reaction can be ensured on a hardware basis, so that this property is retained even in the event of a software malfunction.

A bidirectional network guard is usually designed to produce two separate unidirectional data streams by means of a respective data diode, the data streams flowing in opposite directions. This permits a data interchange in both directions, the one-way function being ensured in each case. By way of example, a bidirectional network guard can be used to convey data from a first network having a high security requirement to a second open network having a low security requirement or from the network having a low security requirement to a network having a high security requirement. The security requirement can relate to integrity and/or availability and/or confidentiality, in particular. In the case of industrial control networks, there are frequently extremely high demands on integrity and availability, which are supposed to be reliably met even in the case of coupling to a factory network, an office network or a public network.

A data transfer from the network having a low security requirement to the network having a high security requirement usually necessitates an additional check in order to ensure the integrity and/or security of the network having a high security requirement and/or the network availability.

Conventional end-to-end encryption, for example using security protocols such as IKEv2/IPsec or TLS, is not implementable between one device, e.g. a field device in the first network, and a communication unit in the second network. The reason is that the unidirectional transfer link cannot be used to establish a session context—for example using popular handshake mechanisms.

Special unidirectional gateway protocols need to be used on the part of the device. That is to say that previously used protocols (e.g. MQTT) need to be replaced and provided by means of the protocol proxy in order to use the unidirectional link. Integration of the unidirectional network connection (for example by means of a data capturing unit, DCU) is therefore not possible without adapting the implementation and the protocol stack of the device.

SUMMARY

An aspect relates to unidirectional data transmission between two networks having different security requirements.

An aspect relates to a method for the cryptographically protected unidirectional data transmission of payload data (e.g. data of the field device), in particular between a first network having a first security requirement and a second network having a second security requirement, which is different in comparison with the first network, wherein one or more data packets comprising the payload data are transmitted on an end-to-end data transmission link from a first communication unit (e.g. client) in a first network via a one-way communication unit (e.g. DCU), which is arranged between the first network and a second network, to a second communication unit in the second network, having the following method steps:

I. stipulating or negotiating at least one cryptographic parameter for the cryptographically protected, unidirectional, data transmission of payload data from the first communication unit to the second communication unit, II. producing at least one transmission data structure containing at least in some cases the negotiated cryptographic parameters for the cryptographically protected data transmission of the data packet or of the multiple data packets, III. encrypting the at least one transmission data structure using a key (public key) of the second communication unit, IV. transmitting the encrypted at least one transmission data structure to the second communication unit in the second network, V. decrypting the encrypted at least one transmission structure, VI. encrypting the payload data to be transmitted to the second communication unit using the negotiated cryptographic parameters and transmitting the encrypted payload data to the second communication unit, and VII. decrypting the transmitted payload data using the cryptographic parameters contained in the decrypted transmission structure.

Step I can be performed between the first communication unit and a virtual communication unit in the first network, on the first communication unit. The cryptographic parameter represents or comprises a session parameter that comprises a cryptographic session key.

Step VI can be directed by means of the one-way communication unit. Encryption in this context denotes cryptographic protection where the integrity of the payload data is protected by a cryptographic checksum (message authentication code, digital signature) or where the payload data are encrypted or where the integrity and confidentiality of the payload data are protected by authenticated encryption.

A third virtual communication unit that carries out steps II, III and IV of claim 1 can be arranged upstream of the one-way communication unit. (Step II and/or III and/or IV can also be performed by the first communication unit).

The data transmission protocol Datagram Transport Layer Security, DTLS for short, can be used on the transmission link section between the first communication unit and the third communication unit.

A further communication unit, which is arranged upstream of the second communication unit, can carry out step V using the cryptographic parameters from the transmission structure (steps VI and VII can be performed by the second communication unit).

The at least one cryptographic parameter results from the authentication and key agreement and can comprise a session key, a cipher suite, a security token, a signature and/or a certificate. The authentication and key agreement takes place between the first communication unit by using a credential (certificate, private or secret key) of the first communication unit and a third or virtual communication unit by using a pseudo-credential. The pseudo-credential is a generally known credential that is in particular also known to the second communication unit. It is used to perform a conventional bidirectional authentication and key exchange protocol locally (on the first device or at least with a device upstream of the one-way communication unit). The protocol messages exchanged during performance of the bidirectional authentication and key exchange protocol are taken as a basis for forming the transmission data structure and encrypting it with a private credential of the second communication unit. The effect achieved thereby is that, after transmission via the one-way communication unit, only the second communication unit can decrypt the encrypted transmission data structure. Nevertheless, the first communication unit can use a conventional bidirectional authentication and key exchange protocol to ultimately establish a session key with the communication unit that is obtainable only unidirectionally.

The method according to embodiments of the present invention is configured in computer-implemented fashion. Within the context of the invention, "computer-implemented" can be understood to mean an implementation of the method where in particular a processor carries out at least one method step.

Embodiments provide for an IoT device/field device to be able to perform an end-to-end-protected unidirectional data transmission to a destination server (IoT backend, IoT Edge gateway) via a one-way communication link, a session key being established dynamically. This requires no further adaptation of a transmission protocol. The transmitted data (packets) are cryptographically protected, which means that end-to-end protection is realizable. Besides the improved security of the data transmission, this has the further advantage that a very simple and therefore inexpensive and reliable one-way communication unit is usable. Furthermore, the same type of transmission can take place, irrespective of whether or not a one-way communication unit is present. A one-way communication unit can therefore also simply be retrofitted as required.

To this end, the DTLS security protocol can be employed such that it is usable purely unidirectionally. This form of DTLS can also be referred to as UDTLS (unidirectional DTLS).

Payload data can therefore be conveyed in cryptographically protected fashion on the basis of available session context information. The challenge is that the DTLS session context (in particular cryptographic session keys, selected cipher suites, protocol options) needs to be initialized on session establishment.

Conventional secure communication protocols can continue to be used in order to encrypt user data (in particular a DTLS record layer or alternatively SRTP (Secure Real-Time Transport Protocol) or IKEv2/IPsec (Internet Key Exchange, IP security).

These data can be transmitted directly, i.e. without protocol conversion and hence directly, via a one-way communication link (e.g. data diode, restrictively configured firewall, which e.g. blocks all incoming data packets).

Another relates to a transmission device suitable for the cryptographically protected unidirectional data transmission of payload data between a first network and a second network, having:
    a providing unit for providing or producing at least one transmission data structure containing (the) at least in some cases negotiated cryptographic parameters for the cryptographically protected data transmission,
    an encryption unit for encrypting the at least one transmission data structure using a (public) key of a second communication unit in the second network,
    a transmission unit for transmitting the encrypted at least one transmission data structure to the second communication unit in the second network,
    an encryption unit for encrypting the payload data to be transmitted to the second communication unit using the negotiated (with a or the aforementioned virtual communication unit) cryptographic parameters and transmitting the encrypted payload data to the second communication unit (by means of a first communication unit in the first network or this virtual communication unit).

Another aspect relates to a decryption device for decrypting payload data via cryptographically protected unidirectional data transmission between a first network and a second network, having:
    a receiving unit for receiving at least one transmission data structure containing (the) at least in some cases negotiated cryptographic parameters for the cryptographically protected data transmission,
    a first decryption unit for decrypting the encrypted at least one transmission structure, and the same or a second decryption unit for decrypting the payload data transmitted to the second network using the cryptographic parameters contained in the decrypted transmission structure.

Another aspect relates to an arrangement comprising the transmission device of the aforementioned type and the decryption device of the aforementioned type, additionally having:
    at least one communication session unit for stipulating or negotiating at least one cryptographic parameter, for the cryptographically protected data transmission of payload data from the first communication unit to a further communication unit.

Another aspect relates to an arrangement comprising the aforementioned communication unit and the communication unit, additionally comprising:
    at least one communication session unit for stipulating/negotiating at least one cryptographic parameter, for the cryptographically protected data transmission of payload data from the first communication unit to a further communication unit.

A possible further aspect relates to a one-way communication unit suitable for the cryptographically protected unidirectional data transmission of payload data between a first network having a first security requirement and a second network having a second security requirement, which is different in comparison with the first network, comprising a transmission device of the aforementioned type.

A unit or component, in particular a communication unit or network component, can in particular be in the form of a hardware component. A component can comprise a processor, in particular.

A processor can, in particular, be a main processor (central processing unit, CPU), a microprocessor or a microcontroller, for example an application-specific integrated circuit or a digital signal processor, possibly in combination with a memory unit for storing program instructions, etc. A processor can for example also be an IC (integrated circuit) or a multichip module, in particular an FPGA (field programmable gate array) or an ASIC (application-specific integrated circuit), an SoC (system on chip), a graphics processor GPU (graphics processing unit), a processor for evaluating a neural network such as for example a TPU (tensor processing unit) or a DSP (digital signal processor). The processor can have one or more computing cores (multicore). A processor can also be understood to mean a virtualized processor or a soft CPU. By way of example, it can also be a programmable processor that is equipped with configuration steps for carrying out the method according to the embodiment of the present invention or is configured by means of configuration steps such that the programmable processor implements the inventive features of the method or other aspects and subaspects of the present invention. The processor can have tamper protection for protecting against physical manipulations, e.g. tamper sensors for detecting physical attacks.

In addition, an aspect relates to a computer program product (non-transitory computer readable storage medium having instructions, which when executed by a processor, perform actions) that is directly loadable into a programmable computer, comprising program code portions suitable for performing the steps of a computer-implemented method according to embodiments of the present invention.

A computer program product, such as for example a computer program means, can be provided or supplied for example as a storage medium or data carrier, such as for example as a memory card, USB stick, CD-ROM, DVD or else in the form of a downloadable file from a server in a network.

BRIEF DESCRIPTION

Some of the embodiments will be described in detail, with reference to the following figures, wherein like designations denote like members, wherein:

FIG. 1: depicts a schematic depiction of the interaction of the communication units or devices; and FIG. 2: depicts a flowchart for an approach.

Mutually corresponding parts are provided with the same reference signs in all figures.

DETAILED DESCRIPTION

In particular, the exemplary embodiments below show merely exemplary realization options, in particular how such realizations of the teaching according to the embodiment of the present invention might look, since it is impossible to cite all of these realization options, nor is it purposeful or necessary to do so in order to understand the embodiment of the present invention.

Moreover, in particular a person skilled in the art, is of course aware of all routine possibilities for realizing the embodiment of the present invention in the prior art, and so there is no need in particular for independent disclosure in the description. In particular, these customary realization variants known to a person skilled in the art can be realized exclusively by hardware (components) or exclusively by software (components). Alternatively and/or additionally, a person skilled in the art, within the scope of his/her expert ability, can choose to the greatest possible extent arbitrary combinations, according to the embodiment of the present invention, of hardware (components) and software (components) in order to implement realization variants according to embodiments of the present invention.

FIG. 1 shows the interaction of the communication units according to embodiments of the present invention.

Two networks NW1 and NW2 are depicted in exemplary fashion. In this instance, the network NW1 can have a different security requirement in comparison with the second network NW2. Network NW1 can correspond e.g. to a factory network, and network NW2 can be a remote network for diagnosis, e.g. for anticipatory maintenance, of the components/units of the network NW1. In network NW1, there is a first communication unit FD, which can be embodied as a field device or IoT device, wherein the field device comprises a client unit C or client component, which can be in the form of a type of communication session unit, for example. This communication session unit can negotiate at least one cryptographic parameter, for a cryptographically protected data transmission of payload data PL (payload) from the first communication unit to a further communication unit. The further or third communication unit in this instance is a virtual communication unit vSrv. In addition, the network NW2 contains a second communication unit, which can be embodied as a remote server rSrv.

A handshake HS (e.g. DTLS handshake, DTLS=Datagram Transport Layer Security) is therefore performed in the denoted step 1, i.e. the communication context and/or one or more cryptographic parameters is negotiated or stipulated with a local, virtual communication unit vSrv. Bidirectional communication takes place.

The transmitter, in this instance the first communication unit C, performs a DTLS handshake with a virtual DTLS endpoint or DTLS server, in the example the virtual communication unit vSrv, which is implemented on the same hardware as the client C. However, it is also possible to use a hardware security module connected to client C, or another communication node. A generally known pseudo-credential can be used for authenticating the virtual server. The pseudo-credential is not used for actually authenticating the DTLS endpoint in this instance, but rather is present virtually in order to be able to perform a (bidirectional) DTLS handshake. In all embodiments, the virtual communication unit vSrc is arranged upstream of a one-way communication unit DCU, e.g. a one-way gateway, a data diode or else a DCU (reaction-free data capture unit http://www.siemens.com/dcu), i.e. from a technical point of view the DTLS handshake takes place locally without being transmitted via the one-way communication unit.

However, a recorded handshake or, generally, information formed on the basis thereof is transmitted as handshake information HSinfo via the one-way communication unit to the server rSrv, so that the server rSry can decrypt the encrypted payload data PL (record layer) that are likewise transmitted to it. This is accomplished by using a generally known key pair (public key PubK and private key PK) for the virtual communication unit vSrv. Furthermore, a generally known cryptographic parameter can be used as a Diffie-Hellman random value for the virtual communication unit vSrv. It is possible for the virtual communication unit vSry both to combine the functions of the client C and the functions of a DTLS server and therefore to set up a DTLS session "with itself". This allows available DTLS implementations to be used without special adaptations.

Information from the DTLS session or the DTLS handshake is then determined on the client C and transmitted to the actual destination server (rSrv), in the example the second communication unit rSrv, unidirectionally. A communication session device (not explicitly depicted in the figure) implemented in the client C can produce and/or provide a transmission data structure referred to as handshake information HSinfo. The handshake information HSinfo essentially contains the information from the key exchange (handshake) between the client C and the virtual communication unit vSrv.

The handshake information HSinfo will be transmitted to the actual destination server, in the example the server rSrv, in a manner encrypted by an encryption unit, not explicitly depicted, in the virtual communication unit vSry and/or in a manner digitally signed by the client C. Encryption is accomplished by using a public key rSry PubK or a digital certificate of the client C. The signature can be provided by the providing node (the transmitter, e.g. client C, or the virtual communication unit vSrv) or by both.

In one embodiment, the handshake information HSinfo is recorded and completely packaged into a transmission data structure and transmitted unidirectionally to the second communication unit rSrv. In a further embodiment, not all of the handshake information HSinfo but rather the resultant security session context (e.g. session key, cipher suite) is transmitted. The handshake information HSinfo is transmitted to the second communication unit rSry immediately after conclusion of the DTLS handshake. In one embodiment, further handshake information HSinfo is transmitted after a DTLS session key update. This has the advantage that the handshake information can be used to decrypt the received, encrypted DTLS data (records) immediately. In a further embodiment, HSinfo is transmitted to the second communication unit rSry after a time delay. This can be done after the DTLS session between the client C and the virtual communication unit vSry has been terminated, and/or after a key update has taken place. This has the advantage that the second communication unit rSry can decrypt the data only later, i.e. during the encrypted data transmission between the client C and the virtual communication unit vSry it is possible neither to monitor nor to manipulate the data.

The actual endpoint, in the example the second communication unit, receives the handshake information and sets up the security session context agreed by the client C with the virtual communication unit vSrv. That is to say that it sets up a DTLS session context that corresponds to the received handshake information HSinfo. This allows it to decrypt the received payload data and to check the integrity thereof.

The encrypted payload data are transmitted by the virtual communication unit vSry in the direction of the second communication unit rSrv. This has the advantage that a regular, unaltered client C can be used on the first communication unit. There is merely a need for a specific communication unit vSry on the (field) device FD that, besides the handshake information HSinfo, receives the encrypted payload data (DTLS record layer) and forwards them without processing to the actual receiver, in the example the second communication unit rSrv. Since the device FD performs both functions (client C and virtual communication unit vSrv), the encrypted transmission of a DTLS record from the transmitter (C) to the actual receiver (rSrv) has end-to-end protection.

The DTLS session can be used to securely transmit in particular IoT protocol messages such as e.g. MQTT Publish messages or CoAP messages.

In a further embodiment, the virtual communication unit vSry is provided on a separate computer as a central component in the installation (factory network). It is therefore possible for multiple field devices FD to use the virtual communication unit vSry as a proxy to transmit data to the second communication unit rSrv. The proxy can thereby also provide another useful functionality such as NAT (for forwarding to the second communication unit rSrv). The fundamental advantage of this embodiment is that the implementation at the field device does not need to be adapted, and scaling effects can be achieved. Nevertheless, the transmission link between the first network (e.g. factory network) of the virtual communication unit vSry and the actual receiver (second communication unit rSrv) has end-to-end protection.

FIG. 2 shows a flowchart for an approach according to the embodiment of the present invention, the individual steps being denoted by the numbers 11 to 25.

The transmitting (field) device FD is configured with an address (IP address, DNS name, URL) of the destination server, in the example the second communication unit rSrv, and an assigned cryptographic key, in the example a public key rSry PubK, a digital certificate vSry cert and a private key vSry PK. Furthermore, the field device FD can have a client certificate FD cert and a client key FD PK.

A virtual communication unit vSry can be implemented in the field device FD. The communication unit uses cryptographic parameters. The actual client C as a DTLS client establishes a DTLS session with its internal virtual communication unit vSry (see step 11). The client can be authenticated on both sides from a protocol point of view DTLS HS (single-sided authentication or no authentication at all is also possible). The result is that a common security session context (e.g. session key and cipher suite in accordance with the handshake information HSinfo) is set up for the DTLS client and the virtual communication unit (see step 12). The handshake information HSinfo is encrypted using the public key rSry PubK of the second communication unit rSry (step 13) and transmitted to the latter (steps 14 and 15). It is also signed by the client, i.e. using the private key thereof FD PK. A further virtual communication unit on the second communication unit rSry decrypts the handshake info HSinfo (step 16) and sets up the security session context with the decrypted HSinfo (step 17) (step 18). After this setup phase, the security session context (in accordance with the HSinfo) is available on the further virtual communication unit of the second communication unit rSrv. If the client of the field device FD now transmits a data packet (step 19), the data packet can be transmitted in encrypted fashion (step 20) to the second communication unit rSry (steps 22, 23) and decrypted there (step 24) and processed (step 25). The special feature is that a purely unidirectional communication takes place between the field device FD and the second communication unit rSrv. A one-way gateway (DCU, data capture unit) merely forwards the data packet or the data packets from the field device FD (step 21) to the second communication unit rSrv, but not in the opposite direction.

In one embodiment, a secret pre-shared key (PSK cipher suite) is used for negotiating the DTLS session (DTLS handshake). In a further embodiment, an unauthenticated DTLS handshake takes place.

Although the present invention has been illustrated and described more specifically in detail by means of the exemplary embodiment, the present invention is not limited by the disclosed examples, and other variations can be derived therefrom by a person skilled in the art without departing from the scope of protection of the present invention.

The processes or method sequences described above can be implemented on the basis of instructions that are available on computer-readable storage media or in volatile computer memories (referred to collectively as computer-readable memories below). Computer-readable memories are for example volatile memories such as caches, buffers or RAM and also nonvolatile memories such as removable data carriers, hard disks, etc.

The functions or steps described above can be present in the form of at least one instruction set in/on a computer-readable memory. The functions or steps are not tied to a specific instruction set or to a specific form of instruction sets or to a specific storage medium or to a specific processor or to specific execution schemes and can be executed alone or in any desired combination by means of software, firmware, microcode, hardware, processors, integrated circuits etc. A wide variety of processing strategies can be used, for example serial processing by a single processor or multi-processing or multitasking or parallel processing, etc.

The instructions can be stored in local memories, but it is also possible to store the instructions on a remote system and to access them via a network.

The transmission device can have one or more processors. The term "processor", "central signal processing", "control unit" or "data evaluation means", as used here, covers processing means in the broadest sense, that is to say, for example, servers, universal processors, graphics processors, digital signal processors, application-specific integrated circuits (ASICs), programmable logic circuits such as FPGAs, discrete analog or digital circuits and any desired combinations thereof, including all other processing means that are known to a person skilled in the art or will be developed in future. In this case, processors can consist of one or more apparatuses or devices or units. If a processor consists of multiple apparatuses, they can be designed or configured for the parallel or sequential processing or execution of instructions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method for cryptographically protected unidirectional data transmission of payload data, wherein one or more data packets comprising the payload data are transmitted on an end-to-end data transmission link from a first communication unit in a first network via a one-way communication unit, which is arranged between the first network and a second network, to a second communication unit in the second network, the method comprising:
   I. negotiating at least one cryptographic parameter, for the cryptographically protected data transmission of payload data from the first communication unit to the second communication unit;
   II. producing at least one transmission data structure containing at least in some cases the negotiated cryptographic parameters for the cryptographically protected data transmission of the data packet or of the multiple data packets;
   III. encrypting the at least one transmission data structure using a key of the second communication unit;
   IV. transmitting the encrypted at least one transmission data structure to the second communication unit in the second network;
   V. decrypting the encrypted at least one transmission structure;
   VI. encrypting the payload data to be transmitted to the second communication unit using the negotiated cryptographic parameters and transmitting encrypted payload data to the second communication unit; and
   VII. decrypting the transmitted payload data using the cryptographic parameters contained in the decrypted transmission structure.

2. The method as claimed in claim 1, wherein a third communication unit, which carries out steps II, III and IV of claim 1, is arranged upstream of the one-way communication unit.

3. The method as claimed in claim 1, wherein the data transmission protocol Datagram Transport Layer Security (DTLS) is used on the transmission link section between the first communication unit and the third communication unit.

4. The method as claimed in claim 1, wherein a further communication unit arranged upstream of the second communication unit carries out step V using the cryptographic parameters from the transmission structure.

5. The method as claimed in claim 1, wherein the at least one cryptographic parameter comprises a session key, a cipher suite, a signature and/or a certificate.

6. A transmission device suitable for cryptographically protected unidirectional data transmission of payload data between a first network and a second network, the transmission device comprising:
   a providing unit for providing or producing at least one transmission data structure containing at least in some cases negotiated cryptographic parameters for the cryptographically protected data transmission;
   an encryption unit for encrypting the at least one transmission data structure using a key of a second communication unit in the second network;
   a transmission unit for transmitting the encrypted at least one transmission data structure to the second communication unit in the second network; and
   an encryption unit for encrypting the payload data to be transmitted to the second communication unit using the negotiated cryptographic parameters and transmitting the encrypted payload data to the second communication unit.

7. A decryption device for decrypting payload data via cryptographically protected unidirectional data transmission between a first network and a second network, the decryption device comprising:
   a receiving unit for receiving at least one transmission data structure containing at least in some cases negotiated cryptographic parameters for the cryptographically protected data transmission;
   a first decryption unit for decrypting the encrypted at least one transmission structure; and
   the same or a second decryption unit for decrypting the payload data transmitted to the second network using the cryptographic parameters contained in the decrypted transmission structure.

8. An arrangement comprising the transmission device as claimed in claim 6 and a decryption device, comprising:
- at least one communication session unit for negotiating at least one cryptographic parameter, for the cryptographically protected data transmission of payload data from the first communication unit to a further communication unit.

9. An arrangement comprising a transmission device and the decryption device as claimed in claim 7, additionally having:
- at least one communication session unit for negotiating at least one cryptographic parameter, for the cryptographically protected data transmission of payload data from the first communication unit to a further communication unit.

\* \* \* \* \*